(12) United States Patent
Arsovski

(10) Patent No.: US 10,671,801 B2
(45) Date of Patent: Jun. 2, 2020

(54) MARKUP CODE GENERATOR

(71) Applicant: Microsoft Technology Licensing, LLC, Redmond, WA (US)

(72) Inventor: Aleksandar Arsovski, Kongens Lyngby (DK)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 59 days.

(21) Appl. No.: 15/605,585

(22) Filed: May 25, 2017

(65) Prior Publication Data

US 2018/0246857 A1  Aug. 30, 2018

Related U.S. Application Data

(60) Provisional application No. 62/465,113, filed on Feb. 28, 2017.

(51) Int. Cl.
| | | |
|---|---|---|
| G06F 17/22 | (2006.01) | |
| G06F 40/154 | (2020.01) | |
| G06F 40/14 | (2020.01) | |
| G06F 40/106 | (2020.01) | |
| G06F 40/117 | (2020.01) | |
| G06F 40/131 | (2020.01) | |
| G06F 40/197 | (2020.01) | |

(52) U.S. Cl.
CPC .......... *G06F 40/154* (2020.01); *G06F 40/106* (2020.01); *G06F 40/117* (2020.01); *G06F 40/131* (2020.01); *G06F 40/14* (2020.01); *G06F 40/197* (2020.01)

(58) Field of Classification Search
CPC ... G06F 17/212; G06F 17/227; G06F 17/2288
See application file for complete search history.

(56) References Cited

U.S. PATENT DOCUMENTS

| | | | | |
|---|---|---|---|---|
| 5,721,938 A | * | 2/1998 | Stuckey | ................ G06F 40/211 704/4 |
| 5,896,537 A | * | 4/1999 | Landi | ...................... G06F 8/434 717/132 |

(Continued)

FOREIGN PATENT DOCUMENTS

| | | |
|---|---|---|
| CA | 2537156 A1 | 3/2005 |
| WO | 2016038503 A1 | 3/2016 |

OTHER PUBLICATIONS

W3.org, Feb. 12, 2017, pp. 1-10 https://www.w3.org/community/webed/wiki/Optimizing_content_for_different_browsers:_the_RIGHT_way.*

(Continued)

*Primary Examiner* — Scott T Baderman
*Assistant Examiner* — Mario M Velez-Lopez
(74) *Attorney, Agent, or Firm* — Mannava & Kang, P.C.

(57) ABSTRACT

A markup generation system generates a markup file that can be interpreted in a consistent manner by different markup viewers. The markup generation system includes inert variables declarations and markers in the markup file. The markup generation system determines a position in a code segment in the markup file for placing the attribute value based on the marker in the code segment. The attribute value can be used by markup viewers to interpret the markup file.

18 Claims, 9 Drawing Sheets

---

CODE SEGMENT 120b, e.g. HTML ELEMENT ATTRIBUTE

```
<td class>="backgroundImage" height="400" background="http://crmdevvm-0039/editor.testHost/templates/images/578363143-881%20(2).jpg"
Align="center" bgcolor="#9136c0" valign="top" property-reference="background:"http://placehold.it/600x426"; height:"426"; bgcolor:"282828">
```

ATTRIBUTE VALUE 118c    ATTRIBUTE VALUE 118d

(56) References Cited

U.S. PATENT DOCUMENTS

| | | | | |
|---|---|---|---|---|
| 7,293,232 | B2* | 11/2007 | Arkhipov | G06Q 10/10 |
| | | | | 715/264 |
| 7,747,590 | B2* | 6/2010 | Rodriguez | H04L 67/2819 |
| | | | | 707/699 |
| 8,483,371 | B2 | 7/2013 | Crandell et al. | |
| 9,323,504 | B1* | 4/2016 | Kinast | G06F 8/35 |
| 10,521,497 | B2* | 12/2019 | Ghosh | G06F 40/14 |
| 2006/0129927 | A1 | 6/2006 | Matsukawa | |
| 2006/0288265 | A1* | 12/2006 | Brookler | G06F 40/131 |
| | | | | 715/202 |
| 2009/0300483 | A1* | 12/2009 | Viet | G06F 17/2247 |
| | | | | 715/236 |
| 2014/0279016 | A1 | 9/2014 | Capel et al. | |
| 2014/0324808 | A1* | 10/2014 | Sandhu | G06F 16/34 |
| | | | | 707/706 |
| 2016/0078006 | A1* | 3/2016 | Straub | G06F 17/227 |
| | | | | 715/235 |
| 2016/0328370 | A1 | 11/2016 | Laborczfalvi | |
| 2018/0004508 | A1* | 1/2018 | Suri | G06F 8/36 |

OTHER PUBLICATIONS

StackOverflow.com "How to find and replace an attribute value in a XML.", Apr. 26, 2015, pp. 1-3 https://stackoverflow.com/questions/28837786/how-to-find-and-replace-an-attribute-value-in-a-xml.*

"CSS Custom Properties for Cascading Variables Module Level 1.", Retrieved from: https://www.w3.org/TR/css-variables-1/#conform-partial, May 3, 2018, 20 Pages.

"How do I comment attributes inside an XML tag?", Retrieved from: https://stackoverflow.com/questions/26461869/how-do-i-corrment-attributes-inside-an-xml-tag, May 3, 2018, 2 Pages.

"How to comment HTML tag attribute in HTML source code?", Retrieved from: https://stackoverflow.com/questions/4744353/how-to-comment-html-tag-attribute-in-html-source-code, May 3, 2018, 2 Pages.

Ducharme, Bob, "XML.com: Setting and Using Variables and Parameters.", Retrieved from: http://web.archive.org/web/20010210212410/http://www.xml.com:80/lpt/a/2001/02/07/trxml9.html, Feb. 10, 2001, 8 Pages.

Nixon, Jeremy, "An Introduction to LESS, and Comparison to Sass—Smashing Magazine.", Retrieved from: http://web.archive.org/web/20150728023052/https://www.smashingmagazine.com/2011/09/an-introduction-to-less-and-comparison-to-sass/, May 4, 2018, 21 Pages.

"International Search Report and Written Opinion Issued in PCT Application No. PCT/US2018/019123", dated May 14, 2018, 14 Pages.

Galavan, Ruairi, "Create custom email templates", https://docs.interco.com/engaging-your-customers/send-emails-that-work/create-custom-email-template, Retrieved on: Mar. 10, 2017, 5 pages.

AD, Srikanth, "Customizing Magento email templates", http://www.srikanth.me/magento-customizing-email-templates/, Published on: Apr. 24, 2015, 7 pages.

Burke, Zara, "A guide to creating HTML emails", https://docs.intercom.com/engaging-your-customers/send-emails-that-work/a-guide-to-creating-html-emails, Retrieved on: Mar. 10, 2017, 9 pages.

"Variable Tags Overview", http://help.pardot.com/customer/portal/articles/2127194-variable-tags-overview, Retrieved on: Mar. 10, 2017, 10 pages.

"Email Builder Overview", http://help.pardot.com/customer/en/portal/articles/2134758-email-builder-overview, Retrieved on: Mar. 10, 2017, 7 pages.

Roberts, Lydia, "Explanation of Doctype, HTML Attributes & Meta Tags in Email", https://litmus.com/community/discussions/39-explanation-of-doctype-html-attributes-meta-tags-in-email, Retrieved on: Mar. 10, 2017, 4 pages.

Williams, et al., "The Rails View: Create a Beautiful and Maintainable User Experience", In Publication of Pragmatic Bookshelf, Apr. 3, 2012, 1 pages.

"Make an asp.net variable accessible across the entire page and all functions/subroutines", http://www.codepal.co.uk/show/Make_an_aspnet_variable_accessible_across_the_entire_page_and_all_functionssubroutines, Published on: Aug. 14, 2002, 7 pages.

"asp.net. Using private variables and property methods instead of state bags", https://www.experts-exchange.com/questions/20309117/ASP-NET-Using-private-variables-and-property-methods-instead-of-state-bags.html, Published on: Jun. 7, 2002, 24 pages.

Loncar, Travis, "PHP SEO: Page-Level Titles, Meta Descriptions, & More", http://www.lunametrics.com/blog/2013/02/19/php-seo/, Published on: Feb. 19, 2013, 7 pages.

"Creating and Using Variables", http://support.alphasoftware.com/AlphaFiveHelp/Web_Publishing_Tutorial/Creating_and_Using_Variables.htm, Published on: May, 9 pages.

"HTML <meta> Tag", https://www.w3schools.com/tags/tag_meta.asp, Published on: May, 14 pages.

Abromeit, et al., "MDN", https://developer.mozilla.org/en-US/docs/Web/HTML/Element/meta, Retrieved on: Mar. 15, 2017, 10 pages.

"Parse a website and turn html content into variables within PowerShell", http://stackoverflow.com/questions/40779204/parse-a-website-and-turn-html-content-into-variables-within-powershell, Retrieved on: Mar. 15, 2017, 3 pages.

"Property Variables", https://support.ca.com/cadocs/0/CA%20Service%20Desk%20Mariager%2012%207-ENU/Bookshelf_Files/HTML/CA_SDM_Impl_ENU/index.htm?toc.htm?property_vars.html, Retrieved on: Mar. 15, 2017, 1 pages.

"HTML Global data-Attributes", https://www.w3schools.com/tags/att_global_data.asp, Retrieved on: Mar. 15, 2017, 9 pages.

"Getting Started", http://lesscss,org/, Retrieved on: Mar. 15, 2017, 11 pages.

"CSS with superpowers", http://sass-lang.com/, Retrieved on: Mar. 15, 2017, 2 pages.

* cited by examiner

FIGURE 3A

CODE SEGMENT 120a, e.g. CSS

MARKER 122a

```
table.body {
    background-color: /* @outer-background */ /#000000/ * @outer-background */ ;
}
```

FIGURE 3B

CODE SEGMENT 120a, e.g. CSS

MARKER 122a

```
table.body {
    background-color: /* @outer-background */ /#F2F2F2/ * @outer-background */ ;
}
```

FIGURE 3C

CODE SEGMENT 120b, e.g. HTML ELEMENT ATTRIBUTE

```
<td class>="backgroundImage" height="400" background="http://crmdevvm-0039/editor.testHost/templates/
images/578363143-881%20(2).jpg"
Align="center" bgcolor="#9136c0" valign="top" property-reference="background:@hero-image; height:@hero-
image-height; bgcolor:@hero-image-bgcolor">
```

MARKER 122c

MARKER 122d

FIGURE 3D

CODE SEGMENT 120b, e.g. HTML ELEMENT ATTRIBUTE

```
<td class>="backgroundImage" height="400" background="http://crmdevvm-0039/editor.testHost/templates/
images/578363143-881%20(2).jpg" property-reference="background:"http://placehold.it/600x426";
Align="center" bgcolor="#9136c0" valign="top" property-reference="background:"http://placehold.it/600x426";
height:"426"; bgcolor:"282828"">
```

ATTRIBUTE VALUE 118c

ATTRIBUTE VALUE 118d

MARKUP CODE GENERATOR

PRIORITY

The present application claims priority to U.S. provisional patent application Ser. No. 62/465,113, filed Feb. 28, 2017, which is incorporated by reference in its entirety.

BACKGROUND

Markup languages such as Hypertext Markup Language ("HTML"), Extensible Markup Language ("XML"), etc., may be used to create a markup file, and markup files are often used to create content, such as webpages or emails, having a particular structure. Markup viewers, such as browsers or email clients, may be used to view content coded in the markup files, including text, images, etc. It can be technically challenging to create a markup file, whereby the markup content is interpreted the same way across different markup viewers. For example, it is technically challenging to create electronic mail ("email") with HTML content, whereby the email will have the same look and feel when interpreted by different email clients and different platforms when the email is displayed. Email clients, such as OUTLOOK™, GMAIL™, etc., may create a restricted environment to prevent cyber-attacks through email. Some of the restrictions imposed by email clients may cause an email with HTML or other types of markup content to not be displayed correctly. For example, an email client receiving an email with HTML may strip the header from the HTML, causing the email to be displayed in erroneous HTML. Thus, the HTML in the email may be unreadable by the user, or, the email may be filtered as spam and user may not receive the email or the email may end up in a junk mail folder. It can be technically challenging to create an HTML email for email clients and a HTML landing page for web browsers, where the HTML landing page is related to the HTML email, and both the landing page and the email have a consistent look and feel when interpreted by email clients and web browsers. For example, email newsletters created for mass consumption often mirror the look and feel of the landing page of the publisher. The email may contain a link to the landing page for content download or signup. Similar challenges can occur for markup content other than email. For example, it can be technically challenging to create webpages that are displayed the same across different web browsers and different platforms without additional look and feel pre-processing after creation of the webpage or processing by the markup viewer. For example, it can be technically challenging to create a webpage with forms that are displayed in the same manner across different web browsers and different platforms, such as on mobile phones and desktops without additional look and feel pre-processing at the web server after creation of the webpage or processing by the web browser.

BRIEF DESCRIPTION OF THE DRAWINGS

Features of the present disclosure are illustrated by way of example and not limited in the following Figure(s), in which like numerals indicate like elements, in which:

FIGS. 3A and 3B illustrate assigning a maker with an attribute value, according to an embodiment of the present disclosure;

FIGS. 3C and 3D illustrate assigning a maker with an attribute value, according to another embodiment of the present disclosure;

DETAILED DESCRIPTION

Figure 1:
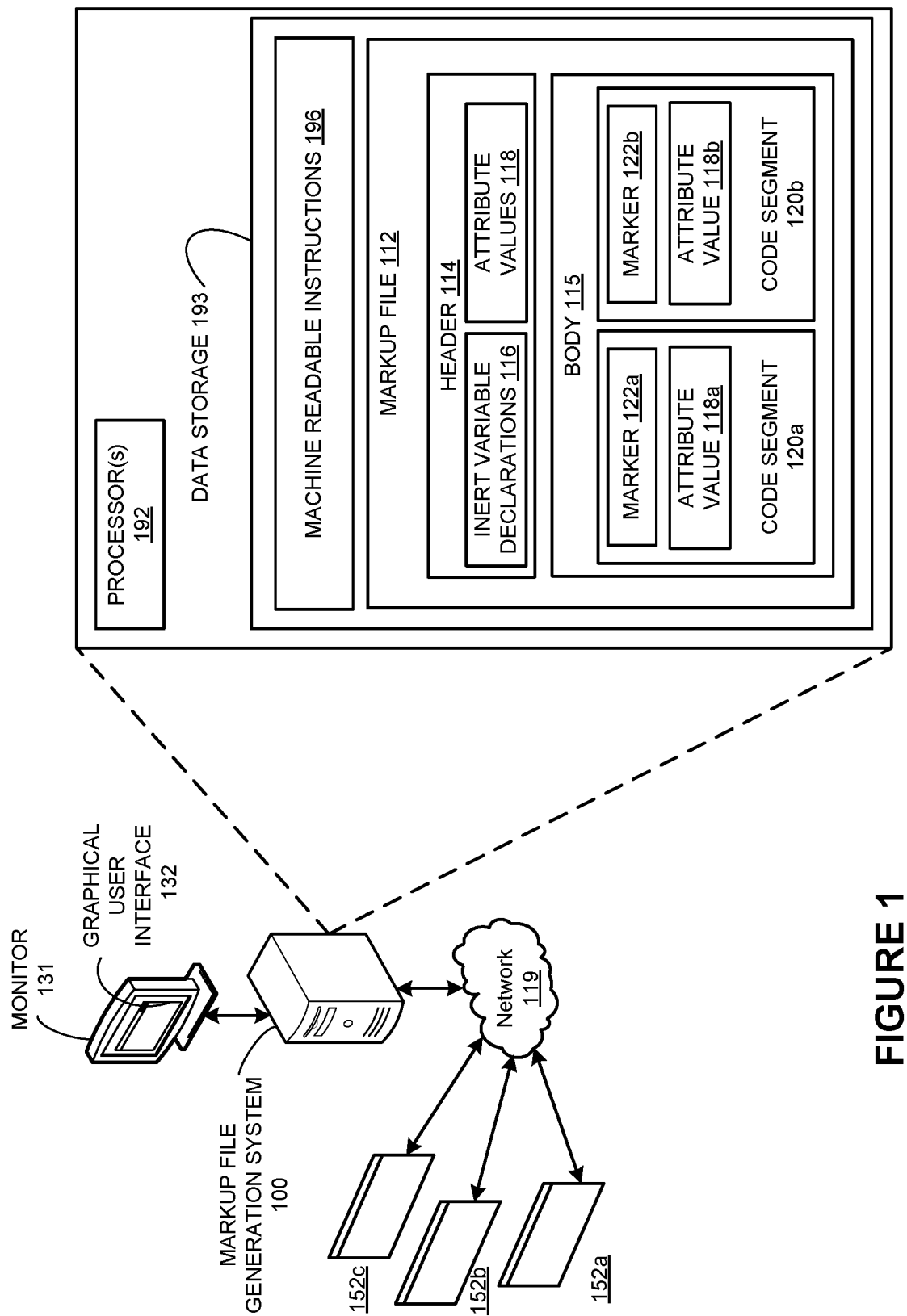
FIG. 1 illustrates a system diagram of a markup generation system, according to an embodiment of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an embodiment of the present disclosure, a markup file generation system may generate a markup file including markup content that can be displayed in a consistent manner by different markup viewers and by different platforms. Examples of markup files include but are not limited to HTML and XML files. The markup file generation system can generate a markup file with an inert variable declaration and a marker in a code segment the markup file. The inert variable declaration and the marker may be invisible to the markup viewer. The marker may be used to determine a location for placing an attribute value, such as background-color, in a code segment in the markup file. The attribute value in the code segment may alter the interpretation of the markup file by the markup viewer to allow content to be displayed similarly across different markup viewers, as is further discussed below. Also, the marker and the inert variable declarations may not be considered as threats by a markup viewer or security risks, and thus can be used to control the display of markup content in these environments. Thus, the markers and the inert variable declarations may allow different markup viewers to consistently interpret the same markup content, resulting in a consistent look and feel of the markup content across different markup viewers and platforms. Furthermore, a marker code generator may utilize the inert variable declarations and markers in the header of a markup file to globally update corresponding attribute values in the body of the markup file.

A markup file may be described as a standardized set of notations for annotating content, for providing information regarding the structure of the content, for providing instructions for displaying the content, and/or for providing instructions for interpreting the content. The standardized set of notations may conform to a markup language. Examples of markup languages may include HTML and XML. HTML, for example, provides a standardized set of notations for encoding or annotating a document and for creating structured documents, including web pages and emails. The content other than the standardized set of notations in the documents may be described as markup content. The markup content may be annotated using the markup, i.e., encoded using the markup. Also, the markup file may include a header and a body. The header of the markup file may include introductory content or a set of navigational links. The body of the markup file may include content such as text, hyperlinks, images, tables, lists, etc. In the markup file, a variable may be a storage location associated with a symbolic name, which may contain some known or unknown quantity of information referred to as a value. A declarative variable may be the variable with a known quantity of information or value, or a variable that may be resolved without accessing variables external to the markup file. The markup file may include other files such as scripts and style sheets. For example, an HTML file may include an associated cascading style sheets (CSS) file and JAVASCRIPT™ file.

An attribute value in a markup file may include a value of at least one markup property such as background-color value or font color value. The attribute value may also include a value used in files that are part of the markup file. For example, HTML files may include JAVASCRIPT™ and CSS. The attribute value may also represent values used in implementing styles using CSS, or values used for calculations in JAVASCRIPT™.

A markup viewer may interpret the markup in the markup file to display markup content in the markup file. The markup viewer may use a parser to interpret the markup content. Examples of parsers that interpret the markup content may include GECKO™, WEBKIT™ and EDGE HTML™. Markup viewers may follow the specification of the markup language for interpreting and displaying the markup content. For example, if the markup file is encoded using HTML 5, the markup viewer follows the HTML 5 specification to interpret and display the markup content. Some markup viewers may implement the specifications differently or may implement their own defaults when the specification does not include documentation for certain features. Also, some markup viewers may implement different versions of the markup language. For example, different versions of LOTUS NOTES™ may support different versions of the markup language. Furthermore, some markup viewers may not implement all the features of the markup language. Also, some markup viewers may restrict certain features of the markup language. A restricted markup viewer may include a markup viewer that implements restrictions on the markup features or on execution of scripts in the markup file, or is located behind a fire wall which prevents access to some or all network resources. Examples of restricted markup viewers include email clients that restrict scripts running on the markup viewer to protect against malware, or a browser in a secure environment that may disable JAVASCRIPT™ or implementation of an access restriction to some or all network resources.

Consistent interpretation or consistently interpreted may refer to altering an interpretation of a markup file by a markup viewer based on an attribute value in the code segment of the markup file, such that interpretation of the markup file by the markup viewer and interpretation of the markup file by another markup viewer converges. Consistently interpreted or consistent interpretation may be achieved by altering an interpretation of the markup file by the markup viewer. Converging of interpretation of the markup file may refer to a consistent interpretation of look and feel or consistent interpretation of the structure of the markup file. Look and feel may refer to themes, layouts and colors of the markup file. For example, OUTLOOK™ may interpret a background-color attribute value with the code segment differently from LOTUS NOTES™. The attribute value in the code segment of the markup file may alter how OUTLOOK™ interprets a background-color instruction for display. The alteration may converge how OUTLOOK™ interprets the instruction for display, with how LOTUS NOTES™ interprets the instruction for display. In another example, a code segment may alter both how OUTLOOK™ interprets and how LOTUS NOTES™ interprets. In yet another example, an attribute value in a first code segment may alter how OUTLOOK™ interprets and an attribute value in the second code segment may alter how OUTLOOK™ interprets to converge how OUTLOOK™ interprets the instruction for display, with how LOTUS NOTES™ interprets the instruction for display. The attribute value in the first code segment and the attribute value in the second segment may or may not be the same.

An inert variable or inert variable declaration and inert marker may be constructed using elements ignored or considered non-intrusive by markup viewers, when interpreting the markup file. For example, a custom meta variable or custom meta-tag in the header of an HTML file is inert and ignored by HTML viewers such as browsers and email clients. The custom meta variable may be used in the inert variable declaration. In an example, the custom meta variable may be in a custom namespace. The custom namespace may be described as a set of symbols that are used to organize objects of various kinds, so that these objects may be referred to by name. The custom namespaces may be structured as hierarchies that allow reuse of names in different contexts. Also, a comment in the body of an HTML file may be inert and thus ignored by HTML viewers such as content within /* */ is ignored by the parser in the HTML viewer. An inert marker may use comments.

The marker may denote a location in the code segment. The marker may be inert in certain instances when comments can be used in the body. For example, in an HTML file, content delimited between /* and */ is ignored by markup file viewers and a specific sequence of comments may be used to create the inert marker.

A technical problem associated with generating a markup file is how to create a markup file that is interpreted consistently by markup viewers without modifying the markup viewer or without modifying the markup languages. Another technical problem is how to avoid complex code, repetitive code or code that needs to be modified for each markup viewer while maintaining the same look and feel of markup content across markup viewers. A markup code generator, according to an embodiment, can create a markup file using inert variable declarations and markers for consistently displaying markup content across different markup viewers and platforms, with minimal code complexity and a minimal amount of additional code. Furthermore, as discussed in further detail below, the attribute values in the markup file may be resolved by the markup viewer using the inert variable declarations and markers. Thus, the markup file generated for distribution may be correctly interpreted by a restricted markup viewer. Additionally, the markup file may be interpreted by the markup viewer without access to external scripts or access to external processing engines or pre-processing to resolve code segments in the markup file.

With reference to FIG. 1, there is shown a system diagram of a markup generation system 100, hereinafter the system 100 according to an embodiment. The system 100 may be referred to as the markup generation system, because it may generate a markup file that is consistently interpreted by markup viewers 152, shown as 152a, 152b, and 152c. Examples of the markup file that may be generated by the system 100 are further discussed below. It should be understood that the system 100 may include additional components and that one or more of the components described herein may be removed and/or modified without departing from a scope of the system 100.

The system 100 may include a data storage 193 to store machine-readable instructions 196 and a markup file 112. The system 100 may generate the markup file 112 which includes a header 114. The header 114 may include inert variable declarations 116 and markers 122. The system 100 may assign or declare the attribute values 118 in the inert variable declarations 116. The markup file 112 may include code segments 120, which are shown as 120a and 120b. The system 100 may assign the attribute values 118 to the markers 122 in the code segments 120 at locations identified by the markers 122. The system 100 may distribute the markup file 112 to markup viewers 152. The markup file 112 may be interpreted consistently by the markup viewers 152 because the marker 122 may be used by the system 100 to place the attribute values 118 in the code segments 120. The markup viewers 152 may use the attribute values 118 to display the markup content in the markup file 112.

Assigning the attribute values 118 at location denoted by the markers 122 in the code segments 120 is an example of encoding the markup file 112. The encoding of the attribute values 118 in the markup file 112 may alter how the markup viewer 152a, e.g., OUTLOOK™, interprets the markup file 112 for display. For example, the attribute values 118 may cause OUTLOOK™ to alter the interpretation for displaying the background-color from an OUTLOOK™ default color to the background-color specified by attribute values 118. Assume the markup viewer 152b is GMAIL™. In GMAIL™, the default background-color may be the same as described by the attribute values 118. Thus, the attribute values 118 in the code segment 120 may be used to converge the interpretation for display of the markup file 112 by both OUTLOOK™ and GMAIL™.

As discussed above, encoding the markup file 112 may include assigning the attribute values 118 to the markers 122 in the code segments 120. In an example, assigning the attribute values 118 to the markers 122 in the code segments 120 may include using the markers 122 to locate a position in each of the code segments 120 to place one of the attribute values 118. The markers 122 may be inert markers so they are ignored by the markup viewers 152 when interpreting the markup file 112. Retaining the marker may allow the system 100 to generate updated markup files such as replies for HTML emails returned by a remote system that are consistently interpreted. In another example, the markers 122 are replaced by the attribute values 118. Replacing the markers 122 may allow the system 100 to generate markup file 112 where inert markers are not technically feasible. In yet another example, the markers 122 may be used to dynamically resolve the attribute values 118 from the corresponding inert variable declarations 116. Dynamic resolution of the attribute values 118 may allow the system 100 to generate markup file 112 where the marker 122 can be dynamically interpreted, such as in a web browser for consistent interpretation of forms displayed in the browser. The system 100 may use a combination of different types of markers discussed above for generating the markup file 112. The encoding of the markup file 112 may be static or dynamic. For example, dynamic encoding of the markup file 112 may be facilitated using a script file such as a JAVASCRIPT™ file. Examples of assigning the attribute values 118 to the markers 122 in the code segments 120 are shown in FIGS. 3A-F and are discussed below.

The inert variable declarations 116 may be used to declare an attribute of interest and assign a value to the attribute. The system 100 may use the inert variable declarations 116 to identify different attributes, label different attributes and track the location of the marker 122 in the markup file 112. The inert variable declarations 116 may represent the attributes for consistent interpretation of the markup file 112. There may be a one-to-many correspondence between the inert variable declarations 116 and the markers 122. The inert variable declarations 116 may be ignored by the markup viewers 152 while interpreting. For example, in an HTML file, the inert variable declarations 116 may be included in custom meta-tag variable such as in custom namespaces. The HTML parsers used in markup viewers may parse the custom meta-tag variable in custom namespaces. The HTML parsers used in markup viewers may not have interpretation instructions for further processing of custom meta-tags in custom namespaces after parsing. Thus, custom meta-tags in custom namespaces are inert in most HTML parsers used in markup viewers and are ignored after parsing by most HTML parsers used in markup viewers. There may be one or more inert variable declarations in the markup file 112.

The system 100 may statically or dynamically assign attribute values 118 to the inert variable declarations 116. Static assignment may be done by the system 100 and dynamic assignment may include dynamically assigning the attribute values 118 to the inert variable declarations 116 when interpreted by the markup viewers 152. For example, webservers serving HTML 5 forms in webpages may use inert variable declarations in the header of the markup file, or serve the markup file with a script file to a markup viewer. At runtime, the markup viewer can assign attribute values from the header to the markers in the code segments. This may reduce the processing at the webserver and the form will be displayed consistently across markup viewers.

As discussed above, according to an example, the inert variable declarations 116, attribute values 118, and the markers 122 may be used to display the same background color for HTML emails in the markup viewers 152, which may include different email clients. In another example, the attribute values 118 in the code segments 120 may alter the interpretation of the markup file 112 to make the interpretation comply with a markup language standard. For example, OUTLOOK.com™ may not support style element margin, while APPLE MAIL™6.5, YAHOO! MAIL™, GMAIL™, ANDROID 4 GMAIL™, IPHONE IOS7/IPAD, OUTLOOK™ 2003, may support style element margin. The attribute values 118 in the code segments 120 may alter the interpretation of the markup file 112 for display by OUTLOOK™ 2007/2010/2013 to comply with the markup language standard, i.e., margin in style sheets. In another example, the attribute values 118 may alter the interpretation of the markup file 112 to make the interpretation not comply with a markup language standard. For example, IPHONE iOS7/IPAD supports border image CSS 3 element, whereas APPLE MAIL™6.5, YAHOO! MAIL™, GMAIL™, ANDROID 4™ GMAIL™, IPHONE IOS7™/IPAD™, OUTLOOK™ 2003 may not support border image CSS 3 element. The attribute values 118 may alter the interpretation of the markup file 112 by using markup tables. The HTML tables may be used instead of the border image CSS3 element to allow consistent interpretation by email clients. In another example, the attribute values 118 may alter the interpretation of the markup file 112, so that the interpretation is consistent with an earlier version than most current of a markup language. In another example, the attribute values 118 may alter an interpretation of the structure of the content of the markup file. For example, GOOGLE PATENTS™ may use XML to denote the various elements of a patent application or patent publication such as claims, specification, inventors, etc. The attribute values 118 may alter the interpretation of the markup file 112 such as an XML file of a patent application by the markup viewers 152 to ensure accurate interpretation of the structural relationship on different markup viewers. Thus, the attribute values 118 may alter the interpretation of the markup file 112 by the markup viewers 152 such that the markup file 112 is consistently interpreted.

The code segments 120 may be located in the body 115 of the markup file 112. For example, in an HTML file, the code segment 120b may be located in the body of the HTML and may include HTML code. In another example, the code segment 120a may be associated with a cascading style sheet and may include styles to display or render a markup file when interpreted by the markup viewer. Also, in another example the code segments 120 may be present in a JAVASCRIPT™ file associated with the HTML file and may include instructions for altering the display of the markup file 112 when interpreted by a markup viewer.

The code segments 120 may include the markers 122 to locate a position in the code segments 120 for assigning the attribute values 118. In another example, the code segments containing the markers 122 may be present in a file other than the markup file 112, such as a CSS or XML file. In an XML file, the attribute values assigned to code segments may alter the interpretation of the structure of the markup file 112. In a JAVASCRIPT™ file, a calculation in the JAVASCRIPT™ may be altered during interpretation by a markup viewer.

The markers 122 may include inert markers. An inert marker may be ignored by the markup viewers 152 when interpreting the markup file 112. The markers 122 and the inert variable declaration 116 may share a many-to-one correspondence, e.g., one inert variable declaration may be linked to multiple markers in an HTML file. The system 100 may receive updates to the attribute values 118 and can automatically update the attribute values 118 in the header 114 and in the code segments 120.

The system 100 may display a preview of the markup file 112 encoded with the attribute values 118 to verify consistent interpretation of the markup file when interpreted by the markup viewers 152. In an example, the system 100 may retrieve the inert variable declarations 116 from the header 114 of the markup file 112 and display the preview in graphical user interface 132, which may be provided in the monitor 131. For example, the preview may verify whether interpretation of the markup file 112 by the markup viewers 152 has a consistent look and feel, consistent interpretation of forms on webservers etc. Also, the system 100 may display in the graphical user interface 132 the attribute values 118 and corresponding description of the attribute values 118 using an attribute editor as described with reference to FIG. 4, and receive inputs to change the attribute values 118. The system 100 may update the attribute values 118 in the header 114. The system 100 may update the attribute values 118 at the locations denoted by the markers 122, in the code segments 120, based on the one-to-many correspondence between the inert variable declarations 116 and the markers 122 to create the markup file 112 for distribution. The markup file 112 may be distributed for example through a network 119 to the markup viewers 152.

Figure 2:
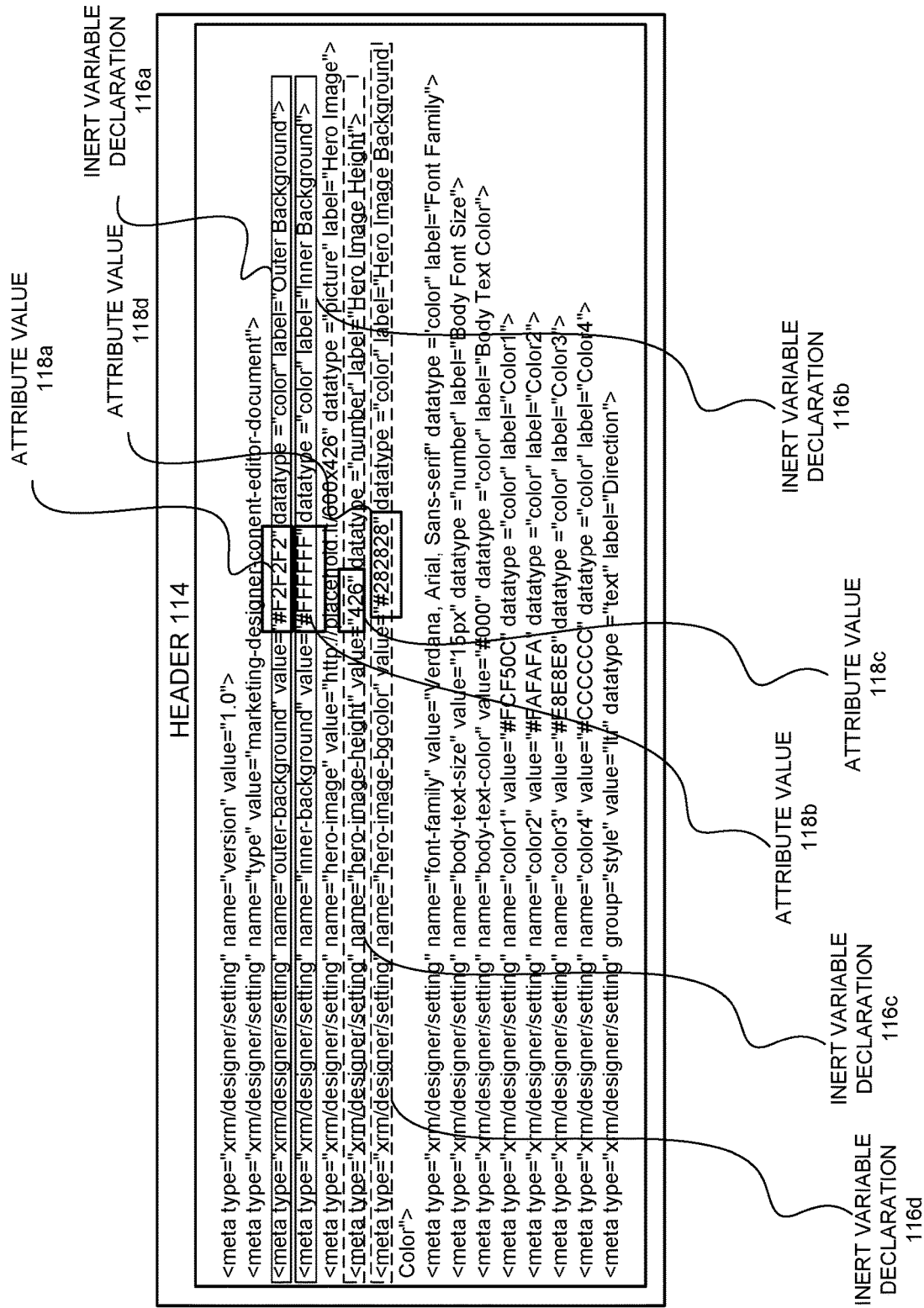
FIG. 2 illustrates a header file, according to an embodiment of the present disclosure.

FIG. 2 shows an example of the header 114 of the markup file 112. The header 114 includes inert variable declarations 116a-d and attribute values 118a-d.

In this example, the inert variable declaration 116a declares outer-background color with the attribute value 118a of # F2F2F2, inert variable declaration 116b declares outer-background color with the attribute value 118b of # FFFFFF, inert variable declaration 116c declares hero-image-height with the attribute value 118c of #426, and inert variable declaration 116d declares hero-image-bgcolor with the attribute value 118d of #2828228. The inert variable declarations 116a-d may be declared using custom meta type declaration. For example, the inert variable declaration 116a is declared using the following custom meta type declaration: <meta type="xrm/designer/setting" name="outer-background" value="# F2F2F2" datatype="color" label="Outer Background">.

The custom meta type declarations may be interpreted by the markup viewers 152 as instructions to a machine such as a web-crawler and are ignored by the markup viewers 152. Also, the custom meta type declarations may not be considered as a security risk by the markup viewers 152. The system 100 may recognize the custom meta type declarations and utilize the inert variable declarations 116 to assign the attribute values 118 to the variables outer-background-color, inner-background-color, hero-image-height, and hero-image-bgcolor. The system 100 may then assign the attribute values 118 to corresponding markers 122 in the body 115 as is further discussed below with respect to FIGS. 3A-F.

FIG. 3A-B illustrate examples of the system 100 modifying a code segment based on an inert variable declaration. In particular, FIGS. 3A-B show an example of the code segment 120a including marker 122a, and assigning the attribute value 118a to the marker 122a in the code segment 120a. The code segment 120a may be a CSS code segment in a CSS file associated with the markup file 112. In another example, the code segment 120a may be in the body 115 of the markup file 112 instead of a file associated with the markup file 112.

FIG. 3A shows the code segment 120a with the marker 122a before assigning an attribute values from the inert variable declarations 116. For example, the code segment 120a includes the variable background-color assigned to a default value of #000000. The default value of #000000 is surrounded by the marker 122a. In the example, the marker 122a is inert because the marker 122a is created using elements such as "/*" and "*/", which denote comments that are ignored during interpretation by a markup viewer.

FIG. 3B shows the code segment 120a after the system 100 assigns the attribute value 118a from the inert variable declaration 116a in the header 114 to the marker 122a in the code segment 120a. For example, the system 100 identifies the marker 122a in the code segment 120a, and identifies @outer-background as a reference to an attribute that may be in an inert variable declaration in the header 114. The system 100 parses the header 114 shown in FIG. 2, and identifies the inert variable declaration 116a containing "outer-background" and attribute value 118a (i.e., F2F2F2) for "outer-background". As shown in FIG. 3B, the system 100 assigns the attribute value 118*a* to the marker 122*a*. For example, the system 100 replaces 00000 with F2F2F2 after the "#" symbol. In another example, the marker 122*a* may be replaced by the attribute value 118*a* as discussed with reference to FIG. 3C and FIG. 3D.

FIG. 3C-D illustrate an example of a code segment 120*b* including markers 122*c-d*. The code segment 120*b* may be in the body 115 of the markup file 112. In another example, the code segment 120*b* may be in a file associated with the markup file 112 such as the JAVASCRIPT™ file.

The system 100 assigns attribute values 118*c-d* in inert variable declarations 116*c-d* in the header 114 shown in FIG. 2 to the markers 122*c-d* shown in FIGS. 3C-D. FIG. 3C shows the code segment 120*b* before assigning the attribute values 118*c-d* to the markers 122*c-d*. The marker 122*c* includes a reference to @hero-image-height, and the marker 122*d* includes a reference to @hero-image-bgcolor. The system 100 uses the reference @hero-image-height from the marker 122*c* to identify the corresponding inert variable declaration 118*c* with the name hero-image-height, and uses the @hero-image-bgcolor from the marker 122*d* to identify the corresponding inert variable declaration 118*d* with the name hero-image-bgcolor in the header 114. As shown in FIG. 3D, the system 100 replaces the marker 122*c* and 122*d* with the values 426 and 282828, respectively, which are the attribute values 118*c-d* for hero-image-height and hero-image-bgcolor, respectively. Thus, the system 100 may generate markup file 112 with static values for the attribute value 118*c-d* that may not be further processing by the markup viewers 152. The system 100 may substitute the marker 122*c* as discussed here, when the code segment 120*b* may not allow for use of comments or other inert markups.

In another example, the system 100 may distribute the code segment 120*b* as shown in FIG. 3C without substitution. A markup viewer may interpret the code segment 120*b* as dynamic calls to the variable values in the header and obtain the values for @hero-image-height and @hero-image-bgcolor directly from the header at runtime. The markup file 112 may include a combination of inert markers and markers, which may not be inert.

Figure 3E:
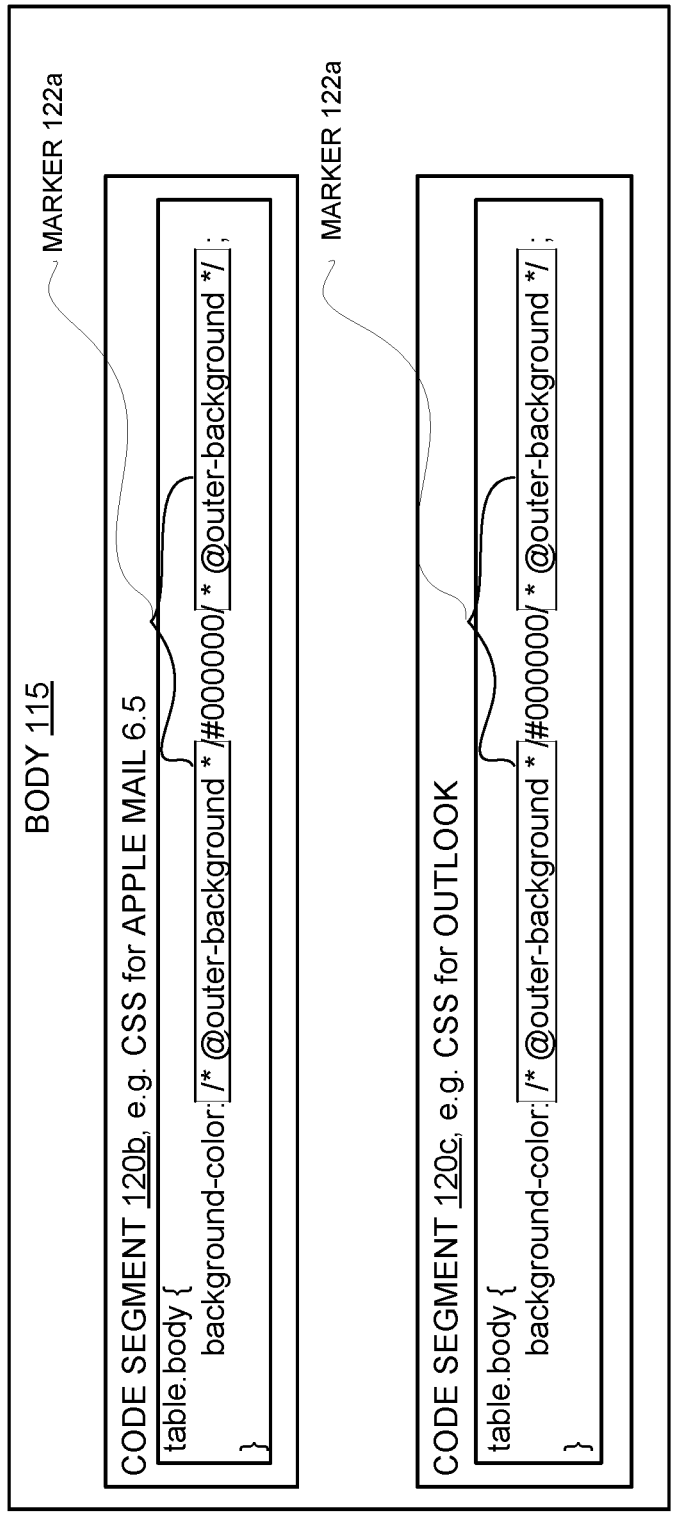
FIGS. 3E and 3F illustrate assigning a maker to multiple locations with an attribute value, according to an embodiment of the present disclosure.
Figure 3F:
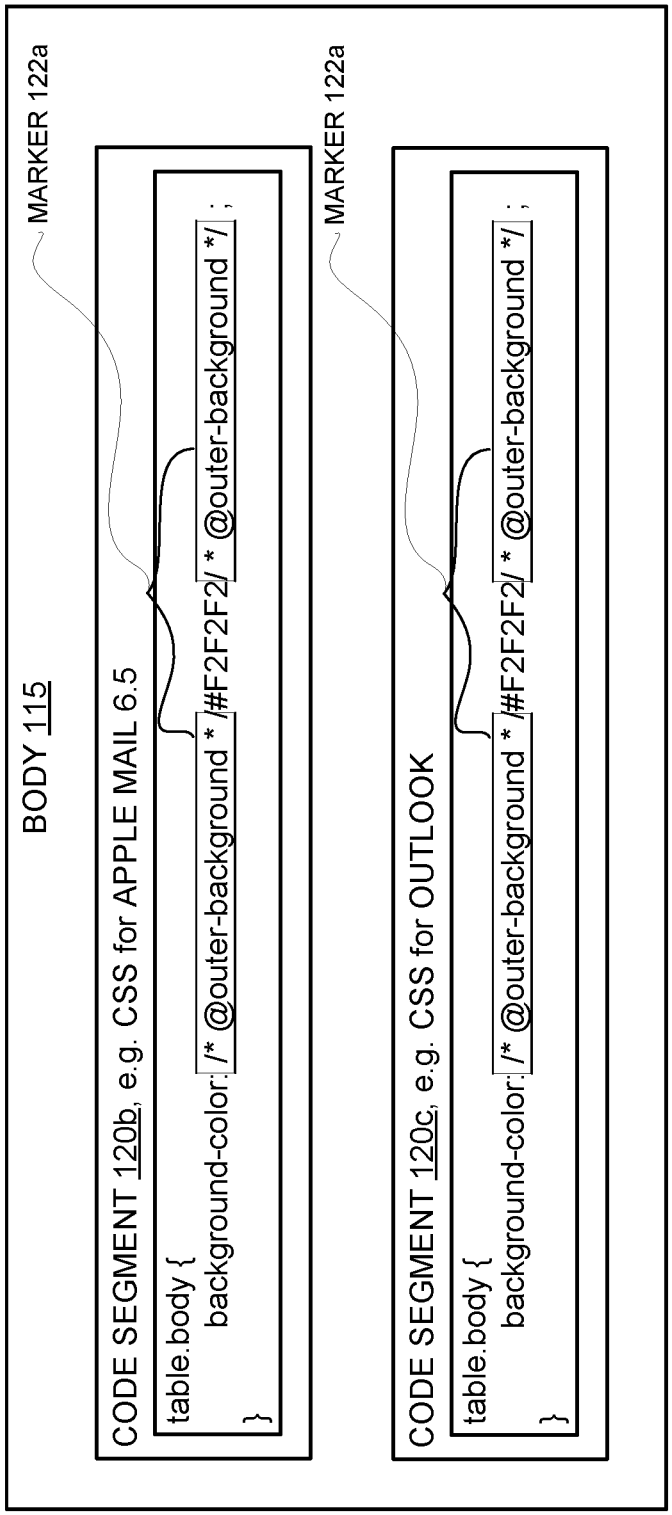

FIG. 3E-F illustrate an example of a one-to-many correspondence between an inert variable declaration in the header 114 and markers in the body 115. For example, the marker 122*a* may be included in multiple locations of the body 115, such as code segments 120*b-c*. FIG. 3E shows the code segments 120*b-c* before the attribute value 118*a* is assigned to the marker 122*a* in each of the code segments 120*b-c*, and FIG. 3F shows the code segments 120*b-c* after the attribute value 118*a* is assigned to the marker 122*a* in each of the code segments 120*b-c*.

In an example, the code segments 120*b-c* may be specific to markup viewers. For example, the code segment 120*b* may be used by APPLE MAIL™ 6.5 and the code segment 120*c* may be used by OUTLOOK™. The code segment 120*b* may be delimited by markup such that the code segment 120*b* is ignored by markup viewers other than APPLE MAIL™ 6.5. Similarly, the code segment 120*c* may be delimited by markup such that the code segment 120*c* is ignored by markup viewers other than OUTLOOK.

Figure 4:
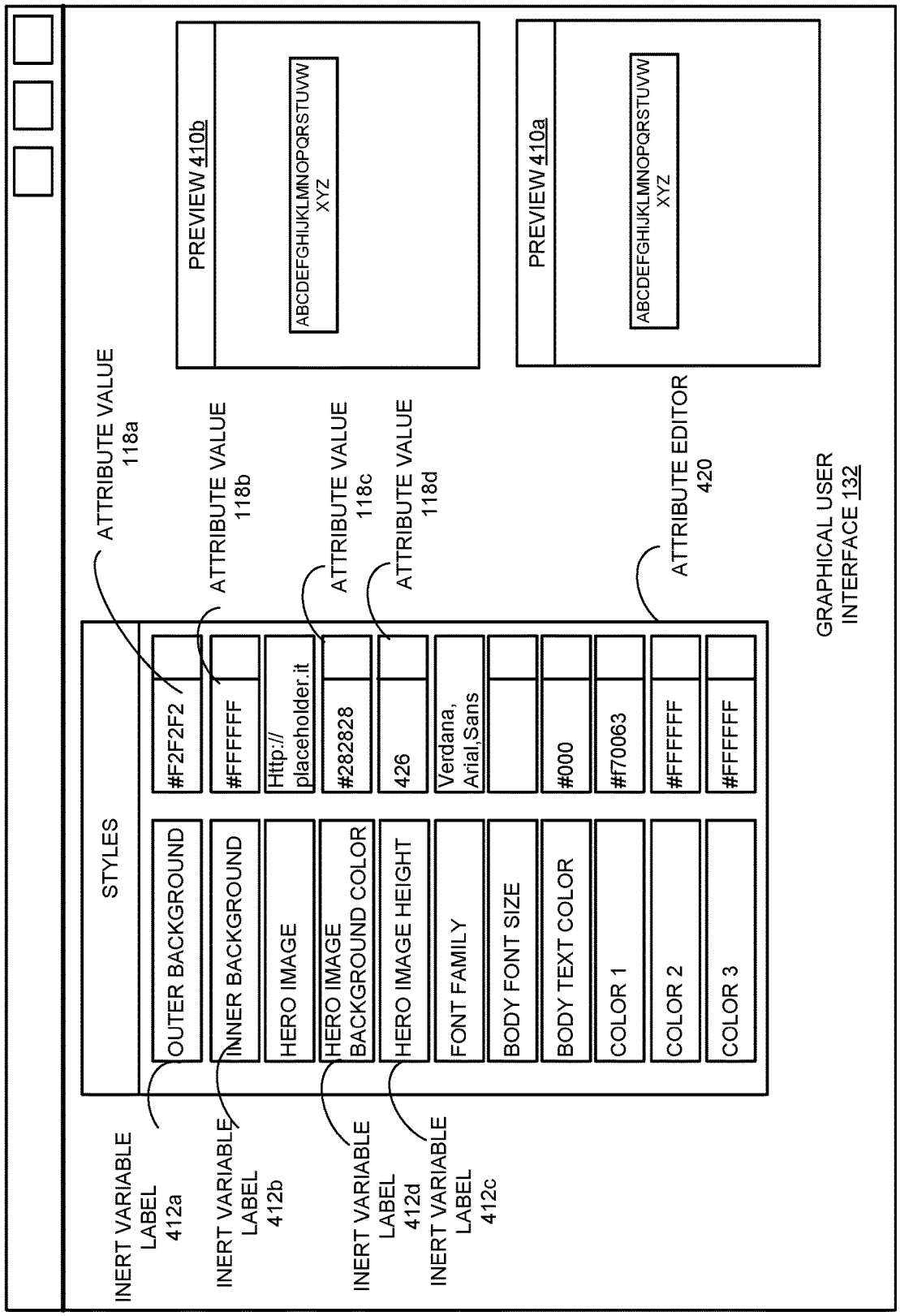
FIG. 4 illustrates a graphical user interface, according to an embodiment of the present disclosure.

FIG. 4 illustrates an example of the graphical user interface 132. The graphical user interface 132 may display previews 410*a-b* of the markup file 112 interpreted by a markup viewer. For example, the system 100 may include a code development environment, and FIG. 4 shows a graphical user interface that allows a developer to make global changes to attribute values in the code, such as header 114 and body 115 of the markup file 112, and view previews of the markup content in the markup file 112 if being displayed by a markup viewer. Accordingly, the graphical user interface 132 may be used to make changes to attribute values and preview the result of the changes. The previews 410*a-b* may be generated by an emulator of a markup viewer, or an interpretation by a markup viewer may be obtained, such as by using the same parser used by the markup viewer or by executing a call for the output from the markup viewer. For example, the preview 410*a* may correspond to an interpretation by the markup viewer 152*a*, such as OUTLOOK™, and the preview 410*b* may correspond to an interpretation by the markup viewer 152*b*, such as LOTUS NOTES™. In another example, the preview 410*a* may correspond to an interpretation by a web browser on IOS8™, and the preview 410*b* may correspond to an interpretation by a web browser on ANDROID™.

The graphical user interface 132 may also include an attribute editor 420 to change the attribute values 118. For example, the graphical user interface 132 may populate the inert variable labels 412*a-d* with the corresponding attribute values 118*a-d* in the inert variable declarations 116*a-d* in the header 114. The attribute editor 420 may also receive updates to the attribute values 118*a-d* and may update the previews 410*a* and 410*b* after encoding the updates to the header 114, and assigning the updated attribute values to their corresponding markers in the code segments 120*a-b*. The graphical user interface 132 may be used to update the markup file 112 for distribution.

Figure 5:
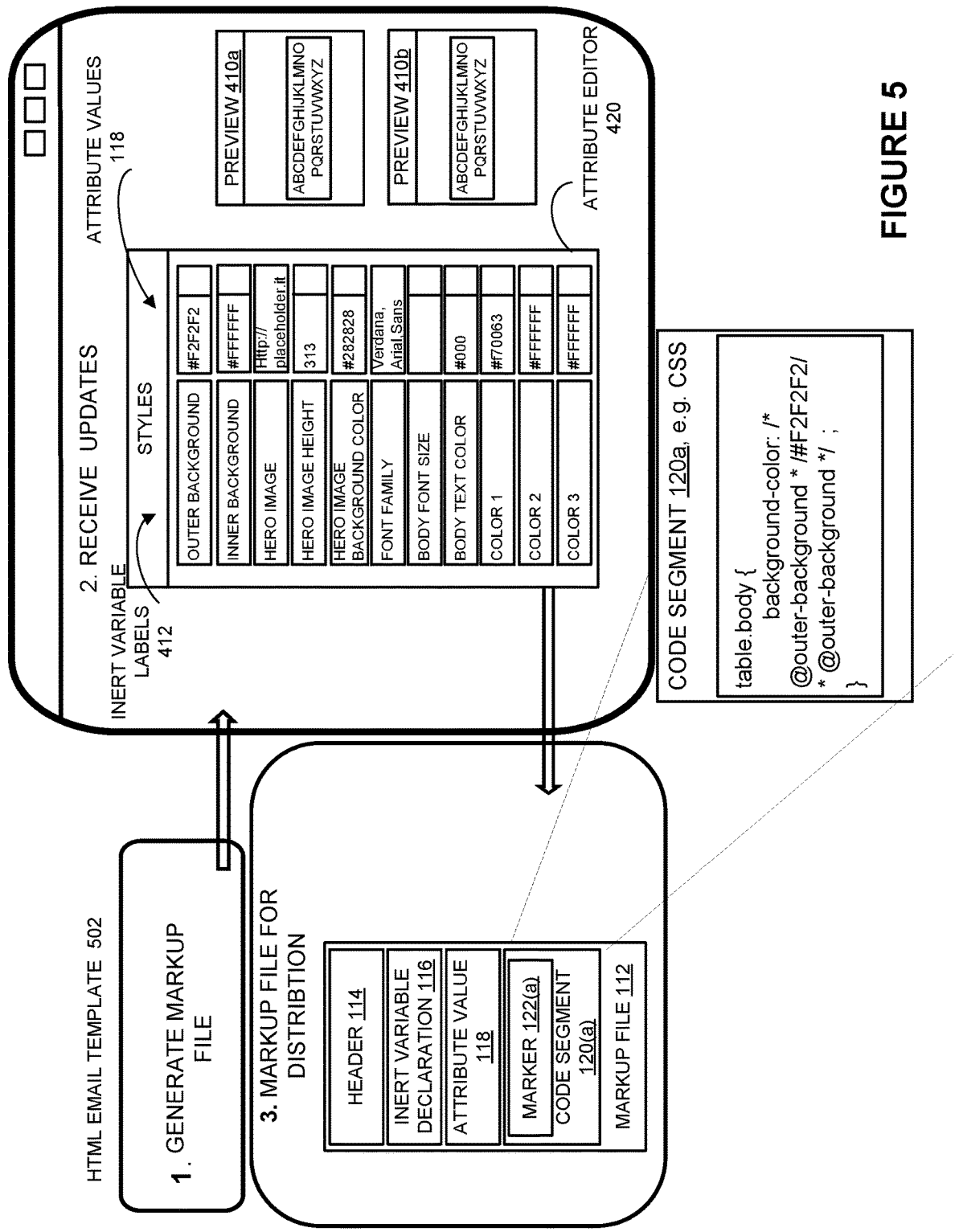
FIG. 5 illustrates creating a markup file from an email template, according to an embodiment of the present disclosure.

FIG. 5 illustrates an example of generating the markup file 112 using the system 100 from an email template. The system 100 displays the graphical user interface 132 to receive attribute values 118 for the inert variables shown as 412 used in the header 114, and which may be used in the body 115, CSSs, JavaScript, etc., of the markup file 112. For example, the system 100 may generate the markup file 112 from email template 502. The email template 502 may include the header 114 with the inert variable declarations 116 which are assigned the attribute values, which may be entered by a user or another computer via the attribute editor 420. Previews 410*a-b* may also be generated for different markup viewers which may be different email clients. The system 100 may encode the markup file 112 for distribution, such as sending the email. In the example shown, the encoded markup file 112 includes a CSS comprised of code segment 120*a*.

Figure 6:
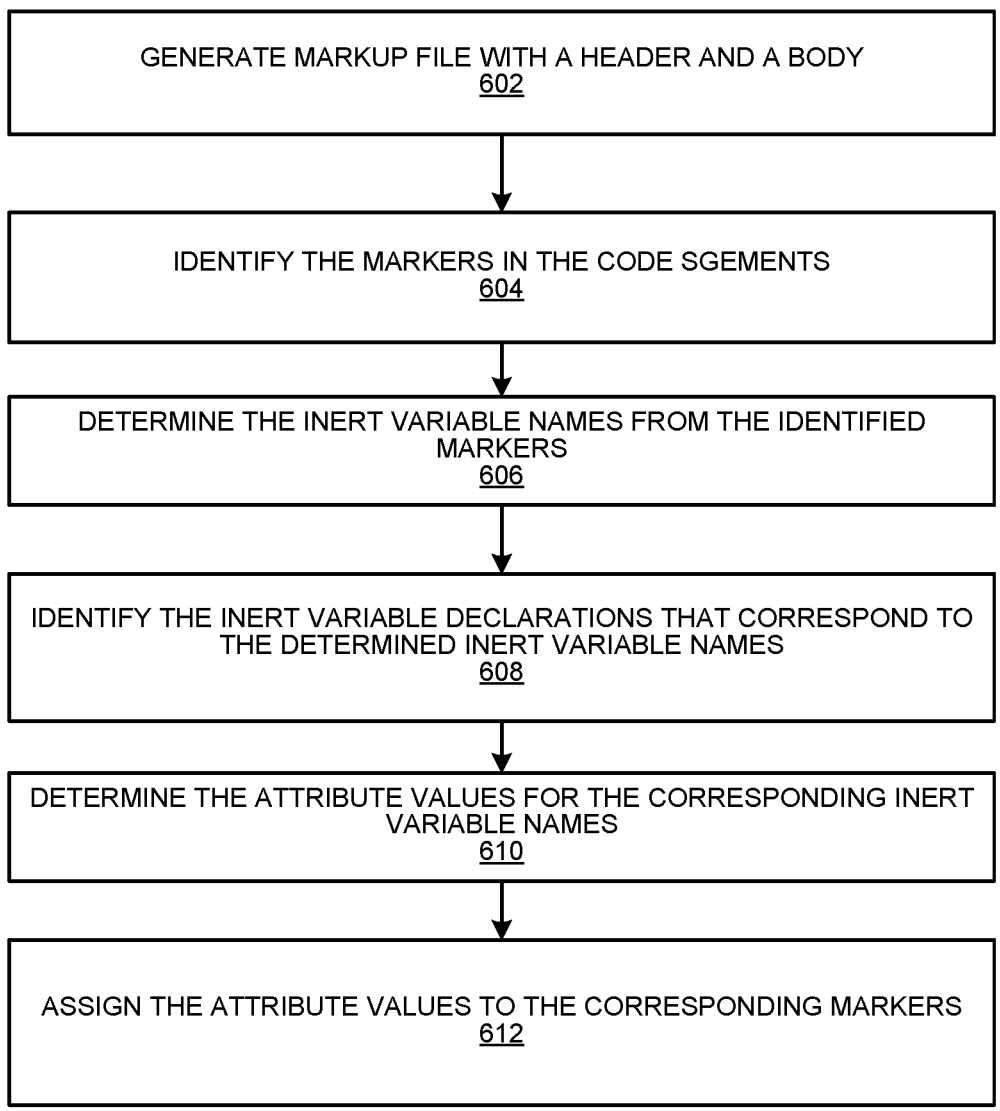
FIG. 6 illustrates a flow chart of a method for markup generation, according to an embodiment of the present disclosure.

FIG. 6 shows an example of a method 600. The method 600 may be performed by the system 100 or another system to perform markup file encoding. The method 600 is described by way of example as being performed by the system 100, and may be performed by other systems. The method 600 and other methods and operations described herein may be performed by one or more servers or other types of computers including at least one processor executing machine-readable instructions, such as shown in FIG. 1. Also, one or more of the steps of the method 600 and steps of other methods described herein may be performed in a different order than shown or substantially simultaneously.

At block 602, the system 100 may generate a markup file, e.g., the markup file 112. For example, the markup file 112 may include the header 114 having the inert variable declarations 116. The inert variable declarations 116 may be assigned the attribute values 118 based on the attribute values specified via the attribute editor 412 or attribute values manually coded in the inert variable declarations 116. The markup file 112 may include the body 115 including at least one code segment, such as code segments 120. The code segments 120 include markers 122 that are also referenced in the inert variable declarations 116, so the system 100 can assign the attribute values 118 to the corresponding markers 122 in the code segments 120. FIGS. 3A, 3C and 3E show examples of markers in code segments in the generated markup file 112 and FIG. 2 shows an example of the header 114.

At block 604, the system 100 parses the code segments 120 to identify the markers 122.

At block 606, the system 100 determines the inert variable names from the identified markers 122. For example, referring to FIG. 3A, the system 100 determines the inert variable name "outer-background" from the marker 122a. Similarly, hero-image-height and hero-image-bgcolor are identified as shown in FIGS. 3C and 3E.

At 608, the system 100 identifies the inert variable declarations 116 in the header 114 that correspond to the inert variable name determined at 606. For example, the system 100 uses the inert variable name "outer-background" determined at 606 to identify the inert variable declaration 116 that includes "outer-background."

At 610, the system 100 determines the attribute values 118 specified for the corresponding inert variable names in the inert variable declarations 116.

At 612, the system 100 assigns the attribute values 118 to the corresponding markers 122. To determine a corresponding marker 122, the system 100 identifies a marker having the same inert variable name as an inert variable declaration and extracts the attribute values from the inert variable declaration. For example, the attribute value F2F2F2 is extracted from the inert variable declaration 116a to assign to the marker 122a. Assigning the attribute value to a marker may include locating a position in the code segment based on the marker, and placing the attribute value at that position. For example, locating the marker 122a as shown in FIG. 3A and replacing 000000 with F2F2F2 as shown in FIG. 3B. FIGS. 3C-F show other examples of assigning attribute values to markers in code segments. After the attribute values 118 are assigned to the code segments 120, the system 100 may distribute the markup file 112. For example, the markup file 112 may include an email that is sent to email clients or the markup file 112 may include a webpage that is sent to browsers, etc.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A system comprising:
   a processor; and
   a memory storing machine-readable instructions executable by the processor to:
      generate a markup file comprising:
         an inert variable declaration including an attribute value; and
         a code segment having an inert marker, wherein the inert marker identifies a position for the inert variable declaration, the position corresponding to a location of the inert marker in the code segment;
      locate the position in the code segment according to the inert marker; and
      assign the attribute value to the inert marker at the located position by replacing the inert marker with the attribute value or placing the attribute value next to the inert marker,
      wherein the attribute value alters an interpretation of the code segment causing content in the code segment to have a same look and feel as displayed by a first markup viewer and a second markup viewer, and
      wherein the attribute value alters an interpretation of the markup file for display by at least one of the first markup viewer that includes a restricted markup viewer or the second markup viewer that includes another restricted markup viewer that implements restrictions on markup features.

2. The system according to claim 1, wherein the machine-readable instructions are executable to:
   interpret the inert variable declaration in the markup file;
   identify the attribute value from the interpretation of the inert variable declaration;
   generate a display of the attribute value in a graphical user interface;
   receive an update to the displayed attribute value; and
   update the inert variable declaration in the markup file with the updated attribute value.

3. The system according to claim 2, wherein the machine-readable instructions are executable to:
   assign the updated attribute value to the inert marker at the located position.

4. The system according to claim 2, wherein the machine-readable instructions are executable to:
   generate a preview simulating displaying of the markup file as interpreted by the first markup viewer or the second markup viewer.

5. The system according to claim 1, wherein the machine-readable instructions to assign the attribute value to the inert marker at the located position are executable to:
   assign the attribute value to a variable in the code segment associated with the inert marker.

6. The system according to claim 1, wherein the markup file comprises a plurality of code segments, each having the inert marker, and the machine-readable instructions to assign the attribute value to the inert marker are executable to:
   assign the attribute value to a variable in each code segment associated with the inert marker.

7. The system according to claim 1, wherein the attribute value alters an interpretation of the markup file to make the interpretation of the markup file not comply with a markup language standard.

8. The system according to claim 1, wherein the attribute value alters an interpretation of the markup file to make the interpretation of the markup file consistent with an earlier version of a markup language compared to a current version of the markup language.

9. The system according to claim 1, wherein the inert marker is a comment and the inert marker is ignored by the first markup viewer and the second markup viewer interpreting the code segment.

10. The system according to claim 1, wherein the markup file comprises an email file or a webpage file.

11. The system according to claim 1, wherein the markup file comprises an Extensible Markup Language ("XML") file or a Hypertext Markup Language (HTML) file.

12. The system according to claim 1, wherein the code segment is in a Cascading Style Sheets (CSS).

13. A non-transitory computer readable medium having stored thereon machine-readable instructions, the machine-readable instructions are executable by at least one processor to:
  generate a markup file comprising:
    an inert variable declaration including an attribute value; and
    a code segment having a marker, wherein the marker identifies a position for the inert variable declaration, the position corresponding to a location of the marker in the code segment;
  locate the position in the code segment according to the marker in the code segment; and
  replace the marker at the located position with the attribute value in the code segment,
  wherein the attribute value alters an interpretation of the code segment causing content in the code segment to have a same look and feel as displayed by a first markup viewer and a second markup viewer, and
  wherein the attribute value alters an interpretation of the markup file for display by at least one of the first markup viewer that includes a restricted markup viewer or the second markup viewer that includes another restricted markup viewer that implements restrictions on markup features.

14. The non-transitory computer readable medium according to claim 13, wherein the instructions are executable to:
  interpret the inert variable declaration in the markup file;
  identify the attribute value from the interpretation of the inert variable declaration;
  generate a display of the attribute value in a graphical user interface;
  receive an update to the displayed attribute value; and
  update the inert variable declaration in the markup file with the updated attribute value.

15. The non-transitory computer readable medium according to claim 14, wherein the instructions are executable to:
  update the attribute value in the code segment.

16. The non-transitory computer readable medium according to claim 13, wherein the instructions are executable to:
  transmit the markup file with the attribute value in the code segment to at least one destination over a network.

17. The non-transitory computer readable medium according to claim 13, wherein the markup file with the attribute value in the code segment comprises an email or a webpage.

18. A computer-implemented method executable by at least one processor, the method comprising:
  generating a markup file comprising:
    an inert variable declaration and an attribute value declared in the inert variable declaration; and
    a code segment having a marker, wherein the marker identifies a position for the inert variable declaration, the position corresponding to a location of the marker in the code segment;
  locating the position in the code segment according to the marker in the code segment; and
  assigning the attribute value to the marker at the located position in the code segment by replacing the marker with the attribute value or placing the attribute value next to the marker,
  wherein the attribute value alters an interpretation of the code segment causing content in the code segment to have a same look and feel as displayed by a first markup viewer and a second markup viewer, and
  wherein the attribute value alters an interpretation of the markup file for display by at least one of the first markup viewer that includes a restricted markup viewer or the second markup viewer that includes another restricted markup viewer that implements restrictions on markup features.

* * * * *